No. 837,548. PATENTED DEC. 4, 1906.
F. J. DOLE.
GARMENT SUPPORTER FASTENER.
APPLICATION FILED JULY 31, 1905.
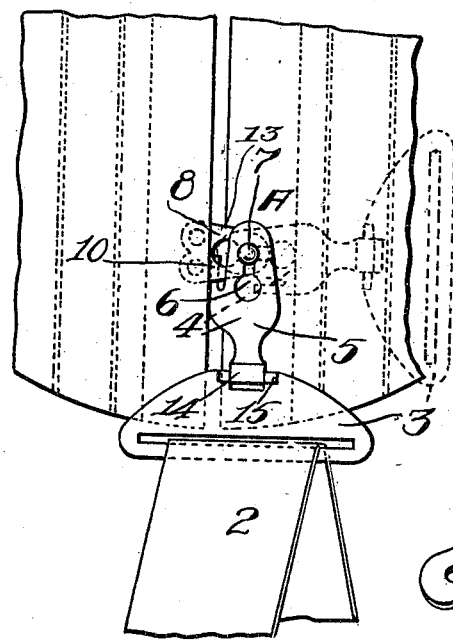
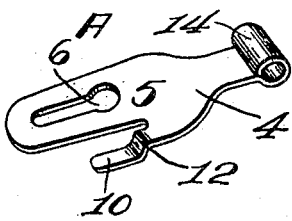
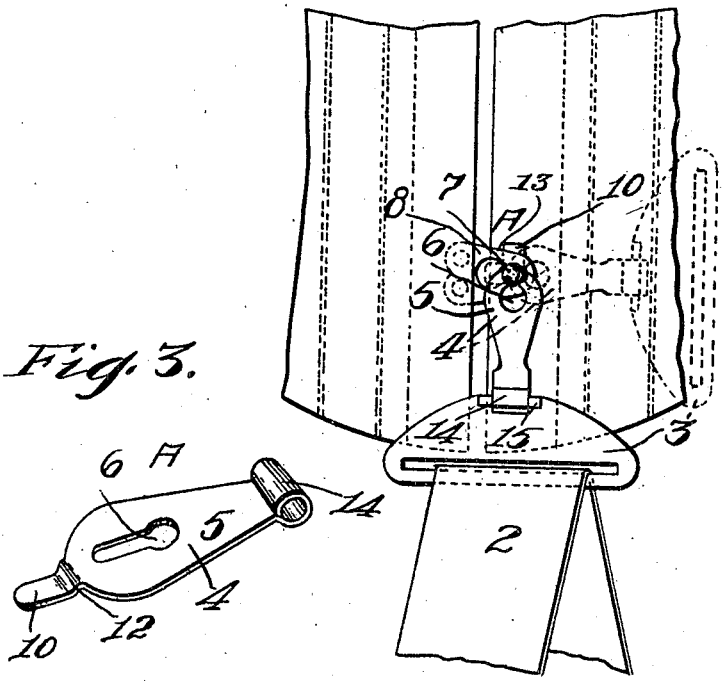
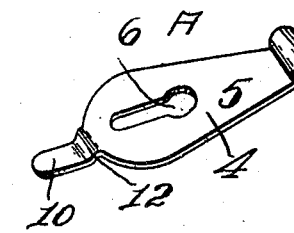
Witnesses:
G. G. Fuss.
Robert Adt.
Inventor.
Frederick J. Dole;
By his attorney
F. A. Richards.

UNITED STATES PATENT OFFICE.

FREDERICK J. DOLE, OF BROOKLYN, NEW YORK.

GARMENT-SUPPORTER FASTENER.

No. 837,548.　　　　　Specification of Letters Patent.　　　　　Patented Dec. 4, 1906.

Application filed July 31, 1905. Serial No. 271,896.

*To all whom it may concern:*

Be it known that I, FREDERICK J. DOLE, a citizen of the United States, residing in Brooklyn, in the county of Kings and State of New York, have invented certain new and useful Improvements in Garment-Supporter Fasteners, of which the following is a specification.

This invention relates to garment-supporters, more particularly to that part thereof by means of which the supporter proper is attached to the article of wearing-apparel and from which it is suspended, the present invention being shown applied to a hose-supporter to connect the same to the clasp of a corset.

The object of the invention is the provision of an extremely simple, inexpensive, effective, and durable one-piece fastener which can be readily stamped out of sheet metal and when in use quickly hooked in position and when properly fastened be so interlocked that it will remain in such position, while at the same time it can be easily detached by slight manipulation.

In the drawings accompanying and forming part of this specification, Figure 1 illustrates one form of this improved garment-supporter fastener attached to a corset-clasp, the dotted lines showing the manner of detaching the same. Fig. 2 is a perspective view, detached, of this form of such fastener. Fig. 3 is a perspective view of another form thereof; and Fig. 4 is a view similar to Fig. 1, illustrating the form of fastener shown in Fig. 3 attached to a corset-clasp, the dotted lines illustrating the mode of detaching the same.

Similar characters of reference indicate corresponding parts in the several figures of the drawings.

I am aware that it is not new, broadly, to provide a fastener for securing a hose-supporter to a corset-clasp; but those devices with which I am familiar either cannot be made of sheet metal, and therefore are not as efficient, or when so made are comparatively complicated and expensive and do not have interlocking action. The present improvement is particularly designed to obviate these disadvantages while providing an extremely simple and effective device which when fastened in position will remain interlocked against slippage or displacement.

The garment-supporter proper may comprise any suitable device adapted for the purpose and usually comprises suitable tapes or elastics 2, a part of which only is shown supported by a slotted member or plate 3, having a hinge connection with this improved fastener 4. In the form shown this fastener (designated in a general way by A) is stamped out of sheet metal and comprises a plate portion 5, having means—as, for instance, an opening 6—shown herein as of keyhole shape, for the reception of a stud or pin 7 of a corset-clasp 8, such plate having a lip, projection, or prong 10 extending therefrom, preferably in such manner that a shoulder 12 is formed. In one form of fastener this lip or prong 10 is located at one side of the slot 6, the plate being slit or cut to provide this lip, while in the other form thereof the lip 10 is located at the upper end or top of the plate. In either form the slot of the plate receives the stud or pin 7 of the corset-clasp, preferably in front of the loop or eye 13 of such clasp, and therefore, preferably, after the corset has been properly clasped at this point, the prong or lip 10 extending to the rear of the eye or loop 13 of such clasp.

The preferred mode of assemblage is shown clearly by the dotted lines in Figs. 1 and 4, from which it will be seen that after the loop 13 and stud 7 of the corset are properly clasped this stud or pin of the corset-clasp is first inserted, or, to be more accurate, the fastener 4 is slipped on such stud 7, that portion of the slot or opening 6 of the fastener having the larger diameter permitting this and then the fastener so shifted that the narrower portion of such slot or opening 6 receives the stud or pin, whereupon on pulling the fastener down into the position shown in full lines the prong 10 at the side in Figs. 1 and 2 can be slipped under the lower edge and to the rear of the eye or loop 13 of the clasp 8, or the prong or lip 10 at the top in Figs. 3 and 4 slipped under and to the rear of the top of said eye or loop 13, such prongs 10 having a slight spring action. In this position the shoulder 12 engages the edge of the loop 13 and prevents movement or displacement of the fastener 4, so that it cannot slip upon the stud 7 to permit the stud or pin to pass into the larger portion of the opening 6 thereof, and consequently the fastener cannot become detached except on the proper manipulation thereof by swinging it upward, as shown in dotted lines, to release the prong or lip 10 from the loop 13 of the clasp 8. In the form shown in Figs. 1 and 2 the prong passes, as stated, to the rear of the corset-loop 13 at the under edge of the loop, while in Figs. 3 and 4 it passes first into the loop and then under and to the rear of the upper portion of such loop or eye 13, it having some resiliency. For the attachment of the slotted plate 3, hereinbefore referred to, the fastener may be bent upon itself, as at 14, to receive the bar 15 of such plate or otherwise suitably formed.

It is to be particularly observed that the fastener 4 in the present construction, in either form thereof, receives the stud or pin 7 of the corset-clasp 8 at the outer side or in front of the loop or eye 13 of such corset-clasp 8, while the lip or prong 10 passes to the rear side of such eye or loop 13, and aside from the fact that it enables the fastener to be attached and interlocked and also detached very quickly, so that it is readily separable from such clasp, while preventing its detachment except on the proper manipulation thereof, it also prevents the unclasping of the corset-clasp 8.

In the form of fastener shown in Figs. 1 and 2 the prong 10 is bent not only from the plane of the plate—that is, away from the plate proper—this being also the case with the form shown in Figs. 3 and 4, but in Figs. 1 and 2 this prong 10 is located at the side or side edge of the plate or fastener, which when in position is adjacent to that part of the loop 13 which is riveted or fastened to the busk, and it thus tends to prevent the movement of the loop 13 and the consequent passage of the pin or stud 7 of the corset-clasp into the enlargement of the loop-opening of the corset-clasp, so that the said fastener thus prevents, in whatever direction the prong projects—that is, either to the front or back— the unfastening of the corset-clasp. It is to be further noted that the manner of forming the prong—that is, by bending it from the plane of the plate—is such that when in position different parts of the clasp-eye 13 are between two alternately-located opposed surfaces of the plate 5—that is to say, in one position of the plate 5 the rear side of the plate portion proper will be at the front of the eye portion 13 of the corset-clasp 8, while the front side of the prong 10 will project at the rear side of this same loop portion 13 of the corset-clasp 8, and thus tend to effectively clamp the clasp-loop 13 against movement in any direction.

It is to be understood that the various details may be more or less modified without departing from the scope of the invention.

I claim as my invention—

1. A detachable clasp for hose or other garment supporters, comprising a one-piece plate adapted to receive the stud or pin of a corset or analogous clasp at one side of the loop of such corset-clasp and provided with a prong interlocking with such loop by projecting to the opposite side of said loop to prevent the unfastening of such corset-clasp while the hose-clasp is in position.

2. A detachable clasp for hose or other garment supporters, comprising a one-piece plate having an opening of different diameters to receive the stud or pin of a corset or analogous clasp at one side of the loop thereof and provided with a prong interlocking with such loop by swinging it from a substantially horizontal into a vertical position to project it to the opposite side of said loop to prevent the unfastening of such corset-clasp while the hose-clasp is in position.

3. A detachable clasp for hose or other garment supporters, comprising a one-piece plate adapted to receive the stud or pin of a corset or analogous clasp at one side of the loop thereof and provided with a prong at one side thereof and interlocking with such loop by projecting to the opposite side of the loop of such corset-clasp to prevent the unfastening of such corset-clasp while the hose-clasp is in position.

4. A detachable clasp for hose or other garment supporters, comprising a one-piece plate adapted to receive the stud or pin of a corset or analogous clasp at one side of the loop of such corset-clasp and provided with a shouldered prong interlocking with such loop by projecting to the opposite side of said loop to prevent the unfastening of such corset-clasp while the hose-clasp is in position.

5. A detachable clasp for hose or other garment supporters, comprising a one-piece plate adapted to receive the stud or pin of a corset or analogous clasp at the front side of the loop thereof and provided with a prong interlocking with such loop by projecting to the rear side of the loop of such clasp to prevent the unfastening of such corset-clasp while the hose-clasp is in position.

6. A detachable clasp for hose or other garment supporters, comprising a plate constructed to carry straps and having a slot of different diameters to receive the stud or pin of a corset or analogous clasp in front of the loop of such corset-clasp and slit at one side to provide a shouldered prong projecting to the rear side of such loop by swinging it from a substantially horizontal position into a vertical position and interlocking it with such corset-loop to prevent the unfastening of such corset-clasp while the hose-clasp is in position.

FREDERICK J. DOLE.

Witnesses:
C. A. WEED,
JOHN O. SEIFERT.